United States Patent
Avati et al.

(10) Patent No.: US 11,016,941 B2
(45) Date of Patent: May 25, 2021

(54) DELAYED ASYNCHRONOUS FILE REPLICATION IN A DISTRIBUTED FILE SYSTEM

(71) Applicant: Red Hat, Inc., Raleigh, NC (US)

(72) Inventors: Anand Vishweswaran Avati, Raleigh, NC (US); Pranith Kumar Karampuri, Jeedimetla (IN)

(73) Assignee: Red Hat, Inc., Raleigh, NC (US)

( * ) Notice: Subject to any disclaimer, the term of this patent is extended or adjusted under 35 U.S.C. 154(b) by 411 days.

(21) Appl. No.: 14/193,581

(22) Filed: Feb. 28, 2014

(65) Prior Publication Data

US 2015/0248434 A1 Sep. 3, 2015

(51) Int. Cl.
*G06F 16/178* (2019.01)
*G06F 16/182* (2019.01)

(52) U.S. Cl.
CPC .......... *G06F 16/178* (2019.01); *G06F 16/184* (2019.01)

(58) Field of Classification Search
CPC ......... G06F 17/30578; G06F 17/30174; G06F 17/30144; G06F 17/30082; G06F 17/30194; G06F 17/30575
USPC ................................................ 707/610, 615
See application file for complete search history.

(56) References Cited

U.S. PATENT DOCUMENTS

| | | | |
|---|---|---|---|
| 5,511,177 A | 4/1996 | Kagimasa | |
| 5,544,360 A | 8/1996 | Lewak et al. | |
| 5,627,996 A | 5/1997 | Bauer | |
| 5,689,706 A | 11/1997 | Rao et al. | |
| 5,745,888 A | 4/1998 | Bauer et al. | |
| 5,886,699 A | 3/1999 | Belfiore et al. | |
| 5,951,649 A | 9/1999 | Dobbins et al. | |
| 6,029,168 A | 2/2000 | Frey | |
| 6,061,678 A | 5/2000 | Klein et al. | |
| 6,421,686 B1 | 7/2002 | Martin, Jr. | |
| 6,466,980 B1 | 10/2002 | Lumelsky et al. | |
| 6,473,767 B1 | 10/2002 | Bailey et al. | |
| 6,697,846 B1 | 2/2004 | Soltis | |
| 6,738,790 B1 | 5/2004 | Klein et al. | |
| 6,856,993 B1 | 2/2005 | Verma et al. | |
| 7,080,102 B2 | 7/2006 | O'Connell et al. | |

(Continued)

OTHER PUBLICATIONS

Birrell, Andrew D., et al., "The Echo Distributed File System", System Research Center, Sep. 10, 1993 26 Pages http://www.hpl.hp.com/techreports/Compaq-DEC/SRC-RR-111.pdf.

(Continued)

*Primary Examiner* — Pierre M Vital
*Assistant Examiner* — Andrew N Ho
(74) *Attorney, Agent, or Firm* — Lowenstein Sandler LLP

(57) ABSTRACT

Delayed asynchronous file replication in a distributed file system is described. A first server receives requests to perform a updates to a first replica of a file. The first server sends, to a second server, an outcast instruction to set a second replica of the file to an out-of-date state. The first server performs the updates to the first replica without sending the updates to the second server. The first server receives a request for updates for the second replica from the second server. The first server transmits the updates to the second server to facilitate a heal operation of the second replica, where completion of the heal operation causes the out-of-date state of the second replica to be changed to an up-to-date state.

16 Claims, 4 Drawing Sheets

(56) References Cited

U.S. PATENT DOCUMENTS

| | | | |
|---|---|---|---|
| 7,107,419 B1 | 9/2006 | Ghemawat et al. | |
| 7,203,731 B1 | 4/2007 | Coates et al. | |
| 7,275,177 B2* | 9/2007 | Armangau | G06F 11/2074 |
| | | | 707/999.202 |
| 7,328,319 B1* | 2/2008 | Bottomley | G06F 11/2082 |
| | | | 707/999.202 |
| 7,418,439 B2 | 8/2008 | Wong | |
| 7,590,667 B2 | 9/2009 | Yasuda et al. | |
| 7,617,259 B1 | 11/2009 | Muth et al. | |
| 7,739,240 B2 | 6/2010 | Saito et al. | |
| 7,885,923 B1* | 2/2011 | Tawri | G06F 11/2064 |
| | | | 707/610 |
| 7,890,469 B1 | 2/2011 | Maionchi et al. | |
| 7,890,632 B2 | 2/2011 | Hazlewood et al. | |
| 7,921,268 B2 | 4/2011 | Jakob | |
| 7,941,709 B1 | 5/2011 | Hong et al. | |
| 7,962,458 B2 | 6/2011 | Holenstein et al. | |
| 8,150,805 B1 | 4/2012 | Tawri et al. | |
| 8,180,747 B2 | 5/2012 | Marinkovic et al. | |
| 8,190,850 B1 | 5/2012 | Davenport et al. | |
| 8,234,317 B1 | 7/2012 | Pogde | |
| 8,301,597 B1 | 10/2012 | Zhou et al. | |
| 8,321,380 B1 | 11/2012 | Leverett | |
| 8,484,259 B1 | 7/2013 | Makkar et al. | |
| 8,977,602 B2 | 3/2015 | Shoens | |
| 8,983,908 B2 | 3/2015 | Gowda | |
| 9,104,675 B1 | 8/2015 | Clark et al. | |
| 9,110,917 B2 | 8/2015 | Avati et al. | |
| 9,304,815 B1* | 4/2016 | Vasanth | G06F 9/4881 |
| 9,986,029 B2 | 5/2018 | Avati | |
| 2002/0107874 A1 | 8/2002 | DeLorme et al. | |
| 2002/0133491 A1 | 9/2002 | Sim et al. | |
| 2002/0194015 A1* | 12/2002 | Gordon | G06F 16/273 |
| | | | 705/1.1 |
| 2003/0149709 A1* | 8/2003 | Banks | G06F 17/30578 |
| | | | 707/999.2 |
| 2003/0159006 A1 | 8/2003 | Frank et al. | |
| 2003/0163568 A1 | 8/2003 | Kano et al. | |
| 2003/0182257 A1 | 9/2003 | O'Connell et al. | |
| 2003/0182328 A1 | 9/2003 | Paquette et al. | |
| 2003/0191745 A1 | 10/2003 | Jiang et al. | |
| 2003/0217119 A1 | 11/2003 | Raman et al. | |
| 2004/0066741 A1* | 4/2004 | Dinker | G06F 11/1662 |
| | | | 370/216 |
| 2004/0128556 A1 | 7/2004 | Burnett | |
| 2004/0139128 A1* | 7/2004 | Becker | G06F 11/1456 |
| | | | 707/999.204 |
| 2004/0205152 A1 | 10/2004 | Yasuda | |
| 2004/0250029 A1* | 12/2004 | Ji | G06F 11/2066 |
| | | | 711/162 |
| 2004/0260726 A1 | 12/2004 | Hrle et al. | |
| 2004/0260972 A1* | 12/2004 | Ji | G06F 11/2066 |
| | | | 714/11 |
| 2004/0260976 A1* | 12/2004 | Ji | G06F 11/2064 |
| | | | 714/31 |
| 2005/0027748 A1 | 2/2005 | Kisley | |
| 2005/0071708 A1 | 3/2005 | Bartfai et al. | |
| 2005/0114285 A1 | 5/2005 | Cincotta | |
| 2005/0144202 A1 | 6/2005 | Chen | |
| 2005/0160427 A1 | 7/2005 | Ustaris | |
| 2005/0193245 A1* | 9/2005 | Hayden | G06F 11/2069 |
| | | | 714/13 |
| 2005/0204106 A1* | 9/2005 | Testardi | G06F 11/1471 |
| | | | 711/162 |
| 2005/0289152 A1 | 12/2005 | Earl et al. | |
| 2006/0059204 A1 | 3/2006 | Borthakur et al. | |
| 2006/0218210 A1* | 9/2006 | Sarma | G06F 17/30578 |
| | | | 707/999.204 |
| 2006/0259527 A1 | 11/2006 | Devarakonda et al. | |
| 2007/0011213 A1* | 1/2007 | Burton | G06F 11/2074 |
| | | | 707/999.204 |
| 2007/0022129 A1* | 1/2007 | Bahar | G06F 9/5011 |
| | | | 707/100 |
| 2007/0038689 A1 | 2/2007 | Shinkai | |
| 2007/0055702 A1 | 3/2007 | Fridella et al. | |
| 2007/0067584 A1* | 3/2007 | Muto | G06F 11/2069 |
| | | | 711/162 |
| 2007/0106712 A1* | 5/2007 | Yamato | G06F 16/273 |
| 2007/0124271 A1 | 5/2007 | Bauchot et al. | |
| 2007/0156506 A1 | 7/2007 | Hara | |
| 2007/0185852 A1 | 8/2007 | Erofeev | |
| 2007/0198550 A1 | 8/2007 | Irving et al. | |
| 2007/0245112 A1 | 10/2007 | Grubbs et al. | |
| 2007/0288533 A1 | 12/2007 | Srivastava et al. | |
| 2007/0299955 A1* | 12/2007 | Hoffman | G06F 17/30581 |
| | | | 709/223 |
| 2008/0010322 A1 | 1/2008 | Lee et al. | |
| 2008/0016300 A1* | 1/2008 | Yim | G06F 11/2064 |
| | | | 711/162 |
| 2008/0109908 A1 | 5/2008 | Havens et al. | |
| 2008/0126833 A1* | 5/2008 | Callaway | G06F 11/1446 |
| | | | 714/6.1 |
| 2008/0201366 A1 | 8/2008 | Devarakonda et al. | |
| 2008/0209145 A1* | 8/2008 | Ranganathan | G06F 11/2074 |
| | | | 711/162 |
| 2008/0235300 A1 | 9/2008 | Nemoto et al. | |
| 2009/0119302 A1 | 5/2009 | Palmer et al. | |
| 2009/0150398 A1 | 6/2009 | Raut | |
| 2009/0193107 A1 | 7/2009 | Srinivasan et al. | |
| 2009/0235115 A1* | 9/2009 | Butlin | G06F 11/1662 |
| | | | 711/162 |
| 2009/0254592 A1 | 10/2009 | Marinov et al. | |
| 2009/0276470 A1 | 11/2009 | Vijayarajan et al. | |
| 2009/0307245 A1 | 12/2009 | Mullen et al. | |
| 2010/0005072 A1 | 1/2010 | Pitts | |
| 2010/0107091 A1 | 4/2010 | Amsterdam et al. | |
| 2010/0185585 A1 | 7/2010 | Schuchardt | |
| 2010/0191884 A1* | 7/2010 | Holenstein | G06F 11/2094 |
| | | | 707/613 |
| 2010/0332456 A1 | 12/2010 | Prahlad et al. | |
| 2011/0161294 A1 | 6/2011 | Vengerov | |
| 2011/0246430 A1 | 10/2011 | Prahlad et al. | |
| 2011/0295804 A1 | 12/2011 | Erofeev | |
| 2011/0313971 A1 | 12/2011 | Hironaga et al. | |
| 2012/0117033 A1* | 5/2012 | Vaidya | G06F 11/1469 |
| | | | 707/679 |
| 2012/0136830 A1 | 5/2012 | Patocka | |
| 2012/0151245 A1 | 6/2012 | Chang et al. | |
| 2012/0151250 A1 | 6/2012 | Saika | |
| 2012/0166390 A1* | 6/2012 | Merriman | G06F 16/2365 |
| | | | 707/613 |
| 2012/0185926 A1 | 7/2012 | Topatan et al. | |
| 2012/0209898 A1 | 8/2012 | Leigh | |
| 2012/0330894 A1 | 12/2012 | Slik | |
| 2013/0024722 A1 | 1/2013 | Kotagiri et al. | |
| 2013/0054524 A1 | 2/2013 | Anglin et al. | |
| 2013/0173530 A1 | 7/2013 | Laron | |
| 2013/0311421 A1 | 11/2013 | Erdogan et al. | |
| 2013/0325804 A1 | 12/2013 | Bachar et al. | |
| 2014/0019413 A1 | 1/2014 | Braam et al. | |
| 2014/0122428 A1 | 5/2014 | Zhou et al. | |
| 2014/0201177 A1 | 7/2014 | Suryanarayan et al. | |
| 2015/0269183 A1 | 9/2015 | Avati | |
| 2015/0269213 A1 | 9/2015 | Avati | |
| 2015/0269214 A1 | 9/2015 | Avati et al. | |

OTHER PUBLICATIONS

Business Wire, "Gluster Announces Apache Hadoop Storage Compatibility in Latest GlusterFS Release", Published Aug. 23, 2011, Available at <http://www.businesswire.com/news/home/20110823005899/en/Gluster-Announces-Apache-Hadoop-Storage-Compatibility-Latest>, retreived Jan. 18, 2013.

"Change I75575fb7: Features/Changelog: Changelog Translator", Review.gluster.org, Updated Jul. 22, 2013, 5 pages http://review.gluster.org/#/c/5127/.

Gluster Inc., "Gluster Filesystem Unified File and Object Storage—Beta 2", Published Aug. 2011, pp. 1-27, Available at <http://hypnotoad.uchicago.edu/roll-documentation/glusterfs/6.0/Gluster_Unified_File_and_Object_Storage.pdf>, retreived Jan. 18, 2013.

(56) References Cited

OTHER PUBLICATIONS

Golub, Ben, "Why I believe in UFOS: Unified file and object storage," Computerworld Blogs, Jul. 28, 2011, 6 pages.

Matheis, Johannes and Mussig, Michael, "Bounded delay replication in distributed databases with eventual consistency", Dec. 17, 2013, 100 pages http://www.diva-portal.org/smash/get/diva2:3243/FULLTEXT02.pdf.

Raghavendra, G., "Change Ie8ddc0fb: Fuse: Auxiliary GFID Mount Support", Gluster.org, updated Jul. 19, 2013, 5 pages http://review.gluster.org/#/c/4702/.

USPTO Office Action for U.S. Appl. No. 14/219,250 dated Dec. 4, 2015.

* cited by examiner

DELAYED ASYNCHRONOUS FILE REPLICATION IN A DISTRIBUTED FILE SYSTEM

TECHNICAL FIELD

The present disclosure relates to a distributed file system, and more particularly, to asynchronous file replication in a distributed file system.

BACKGROUND

Data may be stored as unstructured data, for example, in files and directories in a file system. A distributed file system may store multiple copies ("replicas") of a file and/or directory on more than one storage server machine to help ensure that, in case of a hardware failure and/or system failure, the data is still be accessible. When a server machine updates one of the replicas, such changes are typically propagated to the other replicas within the distributed file system.

DESCRIPTION OF DRAWINGS

The details of one or more implementations are set forth in the accompanying drawings and the description below. Other features and advantages will be apparent from the description and drawings, and from the claims.

DETAILED DESCRIPTION

Figure 1:
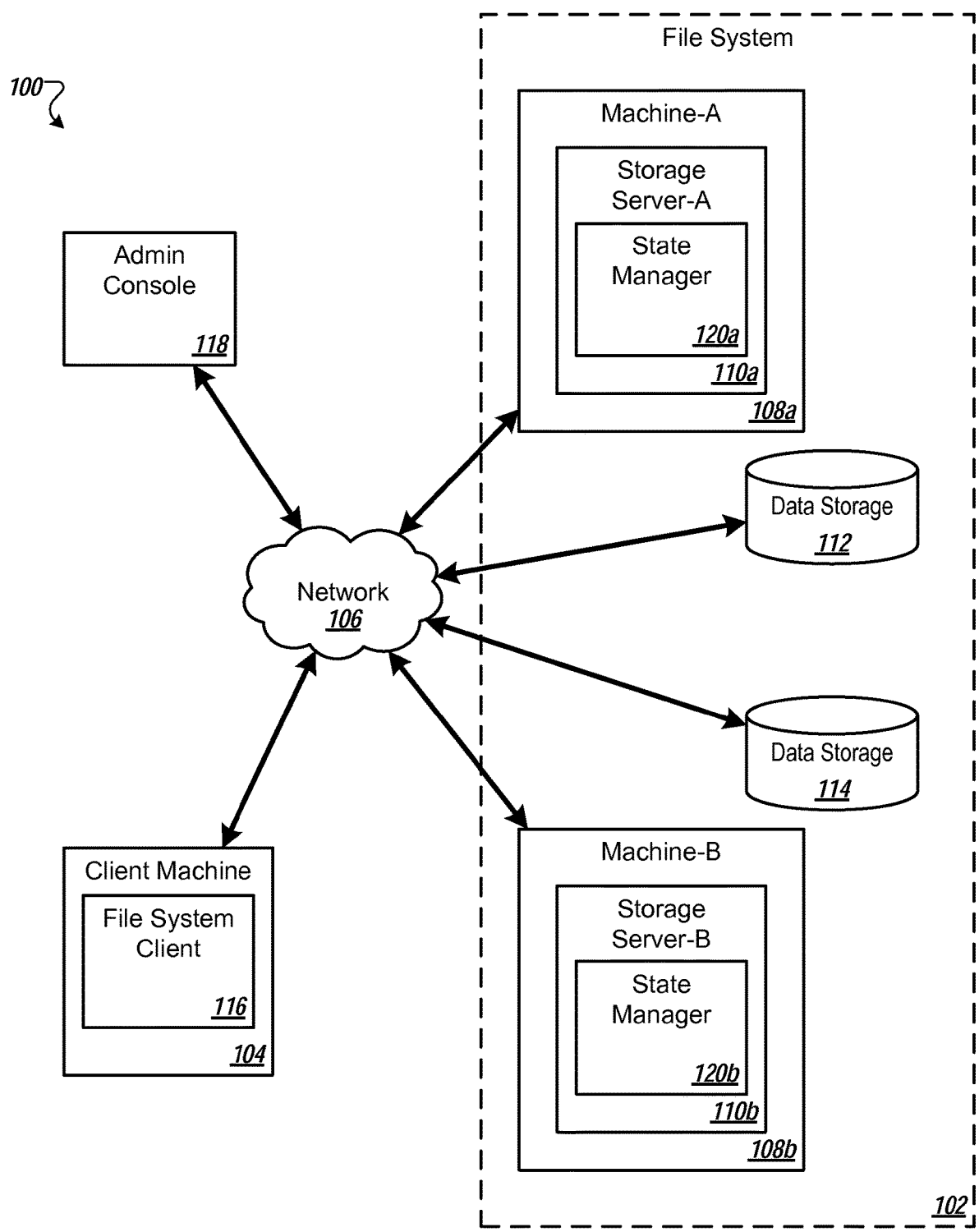
FIG. 1 is an example system architecture for various implementations.

Described herein are techniques for asynchronous file replication in a distributed file system. The distributed file system may include several server machines associated with multiple replicas (copies) of a file (e.g., a virtual machine image file). One of the server machines can perform an update to one of the replicas. When one of the replicas is updated, the other replicas in the distributed file system become out of date until they are updated. The out-of-date replicas can be referred to as target replicas. Because the target replicas are out-of-date, they should not be used as a source replica to update any other replica. The up-to-date replica, which can be referred to as a source replica, can be used for propagating changes to update the out-of-date replicas.

A server machine associated with the source replica can propagate such updates within the distributed file system to update target replicas. For example, server A may store replica A of file X, server B may store replica B of file X and server C may store replica C of file X. If updates were made to replica A, they should be propagated to replica B, replica C, etc. Conventionally, each update to a source replica initiates replication of this specific update to each target replica. If a source replica goes through a large number of updates, it typically results in numerous replication requests/operations, which can cause significant overhead to resources within the distributed file system. Similarly, when updates to a source replica are large in size, updating each of the target replicas can excessively consume distributed file system resources. For distributed file systems with a large number of replicas, these and other problems are compounded because each of the target replicas are synchronized with the source replica, which consumes resources.

Aspects of the present disclosure address these and other shortcomings of conventional systems by providing delayed asynchronous file replication of a file to reduce the number of replication operations and/or transactions within the distributed file system. In an example, a distributed file system includes two replicas of the same file—replica A and replica B. When server A receives one or more requests to perform a large number of updates to a replica A, server A can use an outcast instruction to set other replicas of the file in the distributed file system (e.g., replica B) to an out-of-date state, which is sometimes referred to as an outcast state. The out-of-date state can mean that the other replicas are out-of-date and should not be used by clients (e.g., to write, modify, truncate, delete) and/or as a source of repair for other replicas. Server A can perform updates to replica A in view of the one or more received update requests. Subsequently, when a heal operation is initiated, such as on server B, it can identify the out-of-date state of replica B and determine that replica B should be the target of the heal operation. A heal operation refers to modification of an out-of-date replica to bring it up-to-date. As part of the heal operation, server B can obtain all of the updates that were performed on replica A, which may be thousands of updates. Server B can receive these updates all at once or in one operation. As server B receives the updates, the heal operation can perform the updates on replica B. The completion of the heal operation can cause the out-of-date state of replica B to be changed to an up-to-date state. For distributed file systems with multiple replicas, each of the replicas (other than the source replica), can be set to an out-of-date state and subsequently updated using a heal process similar to that described above. In this manner, the outcast instruction is used to implement delayed replication (i.e., setting replica B to an out-of-date state causes replication not to occur immediately). Hence, rather than replicating each individual update to one or more target replicas, the updates can be deferred, grouped, and sent in one operation to perform fewer but larger updates to the target replicas. For example, when there are 256 writes to the target replica within the same 1 MB range and each write is 4 kb, the updates can be deferred and combined to perform a 1 MB write from replica A to replica B. Using these techniques, a large number of updates can be performed all in one operation while maintaining high availability, performance and consistency.

FIG. 1 is an example system architecture 100 for various implementations. The system architecture 100 can include a distributed file system 102 coupled to one or more client machines 104 via a network 106. The network 106 may be a public network, a private network, or a combination thereof. The distributed file system 102 can be a network attached storage file system that includes one or more machines 108a-b and one or more mass storage devices, such as magnetic or optical storage based disks 112,114, solid-state drives (SSDs) or hard drives, coupled to the machines 108a-b directly or via the network 106. The machines 108a-b can include, and are not limited to, any data processing device, such as a desktop computer, a laptop computer, a mainframe computer, a personal digital assistant, a server computer, a handheld device or any other device configured to process data.

The distributed file system 102 can store data as files and can include directories, which are virtual containers within the file system 102, in which groups of files and possibly other directories can be kept and organized. The machines 108a-b can include storage servers 110a-b to manage the files and directories in the data stores 112, 114 for a corresponding storage server 110a-b. The data stores 112, 114 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

One or more client machines 104 can include a file system client 116 to communicate with the storage servers 110a-b in the file system 102. File system client 116 can request access (e.g., e.g., write, modify, truncate, delete) to a file within the distributed file system 102. Examples of file system clients 116 can include, and are not limited to, native file system clients and network file system (NFS) clients. "Native" can describe support for specific operating systems. For example, a native file system client may be, and is not limited to, a file system client that supports the Linux operating system. The file system client 116 can mount the file system 102 via a mount point to access the data in the file system 102.

Each server 110 can have a state manager 120 that records the state of a replica in metadata that is associated with the replica. For example, state manager 120a can record the state of a replica A to metadata A and state manager 120b can record the state of a replica B to metadata B. Example states of a replica can include an up-to-date state and out-of-date state. The metadata can be stored with its respective replica or can be stored in a different location and associated with the replica. Additionally, the state manager 120 can receive an outcast instruction to set a replica of the file to an out-of-date state. For example, when storage server A 110a starts an update transaction to replica A, the storage server A 110a can send an outcast instruction to storage server B to set replica B to an out-of-date state. The state manager 120 can also change an out-of-date state of a replica to an up-to-date state. For example, a heal operation can replicate changes from replica A to replica B. When replica B is synchronized with replica A, the heal operation is complete. The completion of the heal operation can trigger the state manager 120b to change the out-of-date state of replica B to an up-to-date state.

In an example of operation of the system architecture 100, the file system client 116 can generate a request to update a file. Before the file system client 116 sends the request to perform an update to a file, a storage server 110 is chosen. In implementations, a user of the client machine 104 can choose a preferred storage server 110. In some implementations, the file system client 116 selects the storage server 110. Criteria that can be used to select the storage server 110 can include: location, proximity to the client machine 104, a ping result that is below a threshold, a ping result that is the lowest result of multiple pings to multiple storage servers 110, whether the storage server 110 and the client machine 104 are connected to the same network or subnetwork, an internet protocol (IP) address, a comparison of an IP address of the storage server 110 and an IP address of the client machine 104, a faster server, a most available server, a server closest to the client machine 104, etc. In some implementations, a user selects a group of preferred servers and the file system client 116 selects a server based on the above or other criteria from among the group of servers preferred by the user. Once a storage server 110 is chosen, the file system client 116 sends a request to perform an update to the file to the selected server 110. For simplify of explanation and by way of example, storage server A 110a will be described as having been chosen to perform the update to the file. Similarly, storage server A 110a will be described as being associated with a source replica A. Storage server B 110b will be described as being associated with a target replica B. It should be understood that although FIG. 1 illustrates two storage servers 110a and 110b, the distributed file system 102 can include any number of storage servers 110 that include a replica of the file. Any of these storage servers 110 may be chosen to perform the update to the file.

Upon receiving the request to perform the update to the file, the selected storage server 110 (e.g., storage server A 110a) can identify other storage servers 110 within the distributed file system 102, such as by accessing metadata that includes information related to all of the replicas of a file within the distributed file system 102. Such metadata can include information related to storage servers 110 that are associated with the replicas of the file. The storage server A 110a can send an outcast instruction to the other storage servers 110 (e.g., storage server B 110b, others not shown) to set the other replicas of the file to an out-of-date state. In some implementations, the storage server A 110a can also initiate a lock of the replicas on the other servers before or after sending the outcast instruction. In implementations, the outcast instruction can include information that the storage server A 110a has been chosen to perform the update. The outcast instruction can also include information on how to identify and retrieve the updates from the storage server A 110a and that any heal operation should request and/or obtain the updates from storage server A 110a.

In some implementations, when storage server A 110a starts an update process of replica A, server A acquires a lock of replica A and instructs all other state managers 120 (e.g., state manager 120b on server B) to set their respective replicas to an out-of-date state. In response, the other state managers 120 (e.g., state manager 120b) set their respective replicas to the out-of-date state.

After sending the outcast instruction to the other storage servers 110, the storage server A 110a can perform the update to the replica A without sending the update to the other storage servers 110. In some implementations, prior to performing the update to the replica A, the storage server A 110a receives a confirmation from each other storage server 110 that their respective replicas have been set to the out-of-date state. In implementations, the storage server A 110a uses a changelog to track updates performed to the replica A. A changelog can refer to a data structure (e.g., a file, a table, a web page, etc.) specifying changes made to one or more files. The changelog can be a centralized changelog, such as in a shared space or shared memory, that all servers in the distributed file system can access and update. In some implementations, each server in the distributed file system includes its own changelog. In some implementations, servers within the distributed file system exchange changelogs. After performing the update to the replica A, the storage server A 110a can update the changelog to indicate the first update was performed to the replica.

In implementations, the storage server A 110a can receive a second request to perform a second update to the same file. The second request can come from the same file system client 116 as the first request or from a different file system client (not shown). Similarly, the second request can come from the same client machine 104 as the first request or from a different client machine (not shown). In some implementations, the storage server A 110a is chosen to perform the second update because all of the other storage servers 110 are associated with replicas that are in an out-of-date state. The storage server A 110a can perform the second update to the first replica without sending the second update to the second server. After performing the second update to the replica A, the storage server A 110a can update the changelog to indicate the second update was performed to the replica. The storage server A 110a can receive and perform any number of updates to the replica A and can record such updates to the changelog.

In implementations, when the file system client 116 requests a file from the file system 102, the file system client 116 may be directed to a specific copy (replica) of that file on one of the storage servers 110a-b which can invoke outcast manager 120b to determine the state of the replica. In implementations, the outcast manager 120b can check metadata associated with the replica to determine if the replica is in an out-of-date state, as described herein. When outcast manager 120b determines that replica B in an out-of-date state, outcast manager 120b can inform the file system client 116 that replica B is in an out-of-date state. In some implementations, the outcast manager 120b can provide file system client 116 instructions on how to retrieve a replica of the file that is up-to-date. In some implementations, the outcast manager 120b can communicate with other outcast managers 120 to locate a replica of the file that is up-to-date and facilitate delivery of the up-to-date file to the file system client 116.

Each of the storage servers 110 can include a self-heal component (not shown) that can initiate file repairs for an out-of-date replica of a file. The self-heal component, for example, can be executed by a processing device on machine B 108b. The self-heal component can be a daemon that periodically scans files (e.g., replicas), changelogs and/or metadata associated with the replicas. For example, the self-heal component can periodically scan metadata associated with a replica to determine the state of the replica. When the self-heal component determines that the replica is in an out-of-date state, the self-heal component can initiate a heal operation for the replica that, when completed, causes the out-of-date state of the replica to be changed to an up-to-date state. In implementations, the self-heal component can be initiated when the file system client 116 requests access to a file. For example, while replica B is in the out-of-date state, file system client 116 can request replica B, which initiates the self-heal component to begin a heal operation of replica B. In some implementations, the self-heal component can be initiated by a system administrator (e.g., via an admin console 118). In implementations, the self-heal component can be initiated, for example, when a storage server detects that another server went down and then came back up, etc. In some implementations, the heal operation begins upon detection of a replica in an out-of-date state. In some implementations, the heal operation begins after all pending requests to perform updates to a target file are complete.

As part of the heal operation, the self-heal component can identify a storage server 110 that is associated with the up-to-date replica, such as by referring to the outcast instructions or by communicating with other storage servers 110 until the up-to-date replica is identified. During the heal operation, the self-heal component can request the updates from the storage server A 110a that performed the updates to replica A. Then, the self-heal component can perform the updates to replica B. After performing the updates to replica B, the self-heal component can cause the outcast manager 120b to change the state of the replica from an out-of-date state to an up-to-date state.

In implementations, the replicas can be divided into a set of data portions (e.g., blocks, clusters). Each of the data portions can be equal in size (e.g., 4 kilobytes). In some implementations, the data portions can be different in size while representing an equal characteristic of the file (e.g., each portion can represent a 10 second length of a video). The first update can be an update to one or more of the data portions of the replica A. Similarly, the second update can be an update to one or more of the data portions of the replica A. When sending updates to the server B 110b to heal replica B, server A 110a can group multiple updates and send them in the same operation to server B 110b. For example, when there are 256 updates to replica A and each write is 4 kilobytes, server A 110a can send all 256 updates to server B 110b in the same operation. The size of the combined updates is 1 megabyte. Thus, in this example, the size of the transmission that server A 110a sends to server B 110b when sending the updates is 1 megabyte, which is larger in size than any one data block (4 kilobyte).

In one implementation, the out-of-date state of a replica is tracked using metadata. In implementations, the metadata of each replica is represented by a bitmap, with each bit in the bitmap indicating whether a corresponding portion of that replica has been updated (e.g., "0" for unmodified, and "1" for modified). For example, a bitmap A1 can correspond to replica A and a bitmap B2 can correspond to replica B. After replica A is updated, storage server B 110b can look at a bitmap A1 during a heal operation to see what portions of replica A were changed, and can propagate those changes to respective portions of replica B.

In some implementations, once storage server A 110a sends the outcast instruction to storage server B 110b, bitmap B2 on storage server B 110b is modified to provide an indication of the out-of-date state of replica B. This indication may be provided by, for example, setting all bits of bitmap B2 to 1, or to some other values, which provide a unique combination ("outcast index") indicating the out-of-date state of replica B. While replica A is being updated, storage server A 110a can update bits of bitmap A1 to indicate a count of updates and/or specify what portions of replica A have been updated. While replica B is being healed, server B can update bits of bitmap B1 to reflect a current count of remaining updates and/or specify what portions of replica 2 have been healed. Once the healing of the entire replica B is complete, bitmap B2 on server B should match bitmap A1, thereby removing the out-of-date state of replica B. If the healing of replica B has not completed (e.g. due to problems with server A), bitmap B2 on server B indicates the out-of-date state of replica B, which means that replica B is out-of-date and cannot be used by clients and/or as source of repair for other replicas (e.g., replica C which is not shown).

Figure 2:
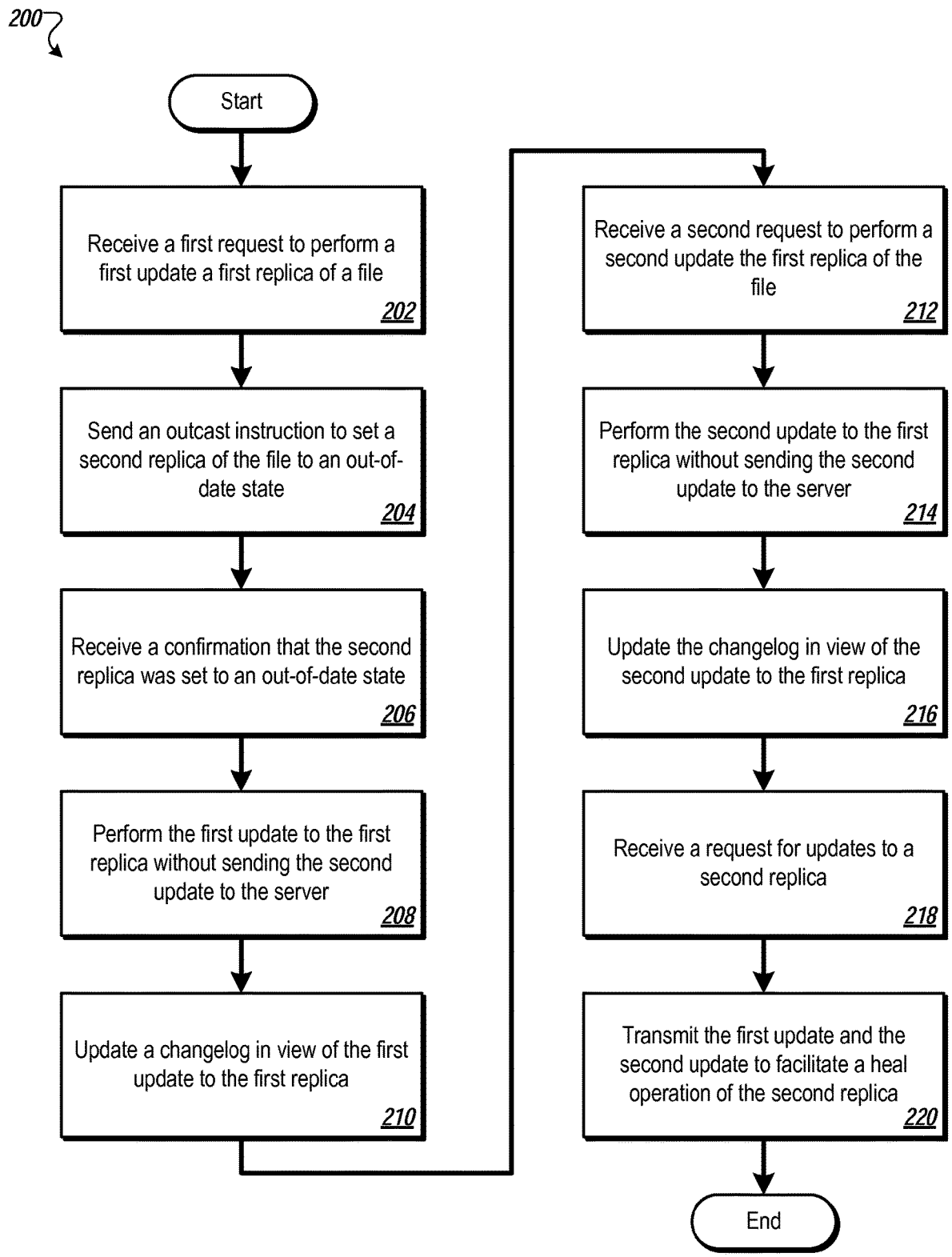
FIG. 2 is a flow diagram of a method for delaying asynchronous replication of a replica file in a distributed file system in accordance with some implementations.

FIG. 2 is a flow diagram of a method 200 for delaying asynchronous replication of a replica file in a distributed file system in accordance with some implementations. Method 200 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In implementations, method 200 is performed primarily by a storage server 110 of FIG. 1. For clarity of presentation, the description that follows uses the system 100 as examples for describing the method 200. However, another system, or combination of systems, may be used to perform the method 200.

Referring to FIG. 2, in one implementation, method 200 begins at block 202 where the processing logic receives a request to perform a first update to a first replica of a file. At block 204, processing logic sends an outcast instruction to set a second replica of the file to an out-of-date state to a server. At block 206, processing logic optionally receives a confirmation that the second replica was set to an out-of-date state from the server. At block 208, processing logic performs the first update to the first replica without sending the first update to the server. At block 210, processing logic optionally updates a changelog in view of the first update to the first replica, as described herein.

At block 212, processing logic receives a second request to perform a second update to the first replica of the file. In some implementations, the processing logic receives the first request from a first client device and processing logic receives the second request from a second client device. At block 214, processing logic performs the second update to the first replica without sending the second update to the server. At block 216, processing logic optionally updates the changelog in view of the second update to the first replica.

At block 218, processing logic receives, from the server, a request for updates that were made on the first replica. The request for the updates can be associated with a heal operation of another replica (e.g., replica B) at the server. At block 220, processing logic transmits the first update and the second update to the second server to facilitate a heal operation of the second replica, where completion of the heal operation causes the out-of-date state of the second replica to be changed to an up-to-date state. In implementations, the processing logic can transmit the changelog to the server along with the first and second update.

Figure 3:
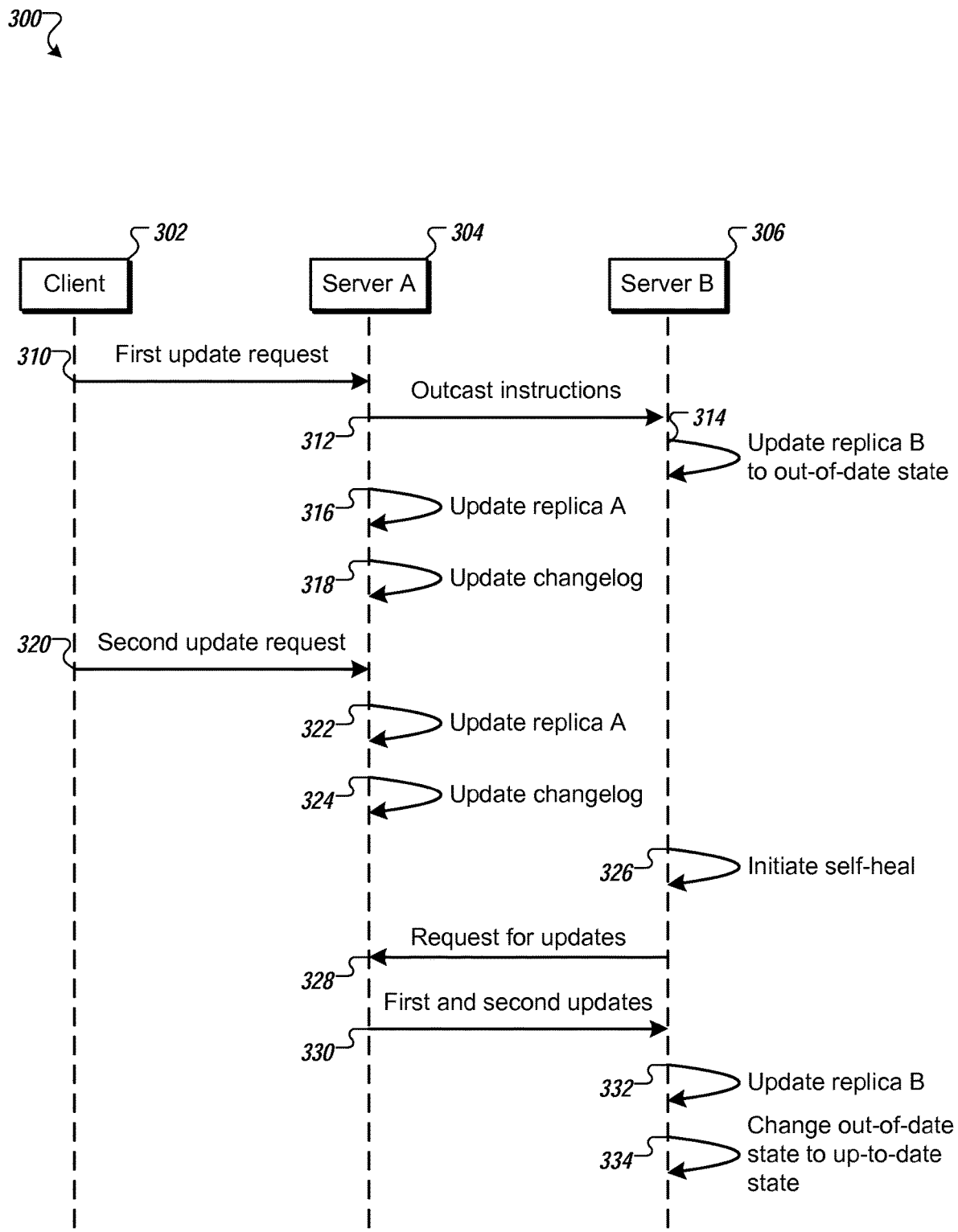
FIG. 3 illustrates a sequence diagram for delaying asynchronous replication of a file in a distributed file system in accordance with implementations.

FIG. 3 illustrates a sequence diagram 300 for delaying asynchronous replication of a file in a distributed file system in accordance with implementations. The distributed file system can include any number of servers (e.g., server A 304, server B 306) and can be accessed by any number of clients, one of which can be client 302. In some implementations, client 302 can be client machine 104 of FIG. 1, server A can be storage server A 110a of FIG. 1 and server B 306 can be storage server B 110b of FIG. 1.

In FIG. 3, at 310 the client 302 can initiate an operation to a file (e.g., write, modify, truncate, delete) on server A 304, such as by sending a first request to server A 304 to update a file in the distributed file system. In implementations, the client 302 can initiate a lock of each replica on each of the servers. In some implementations, the client 302 can initiate a lock of a portion (e.g., a portion to be modified) of a replica to be updated (e.g., replica A).

At 312, server A 304 sends an outcast instruction to server B to set a second replica of the file (e.g., replica B) to an out-of-date state. In implementations where the distributed file system includes more than two replicas of the file, server A 304 can send an outcast instruction to each of the servers to set their respective replicas to an out-of-date state.

At 316, server A 304 performs the first update to the first replica without sending the first update to server B. In implementations where the distributed file system includes more than two replicas of the file, server A 304 can perform the first update to the first replica without sending the first update to any other server. At 318, the server A 304 can update a changelog that is used to track updates to the replica to indicate the first update to replica A.

At 320, the client 302 can initiate a second operation to the file on server A 304. In implementations, the out-of-date state of replica B is tracked using a bitmap. The outcast instruction associated with the first update can include an instruction to update the bitmap to indicate that the replica B is in an out-of-date state. Server A 304 can send another outcast instruction to server B to update the bitmap to indicate the second update to replica A. Server B 306 can update the bitmap accordingly. At 322, server A 304 performs the second update to the first replica without sending the second update to any other server (e.g., server B 306). At 324, the server A 304 can update the changelog to indicate the second update to replica A.

At any time, server B 306 initiates a heal operation at 326. The heal operation can be initiated automatically (e.g., a daemon), in response to a node (e.g., server) coming up or going down, on user request, or from a client (e.g., client 302) requesting to access the file, etc. As part of the heal operation, server B 306 identifies replica B as being in an out-of-date state. During the heal operation, server B 306 also determines that server A 304 has updates for synchronizing replica B and replica A. Server B 306 sends a request for updates to server A 304 at 328. In response, server A 304 sends the updates. In implementations, the server B 306 requests all updates (e.g., the first and second updates) that server A 304 has performed on replica A and server A 304 can respond by sending all of the updates to server B 306. In some implementations, the server B 306 requests specific updates from server A 304 (e.g., the first and second updates) and server A 304 can respond by sending the requested updates to server B 306. In this implementation, the server B 306 can identify specific updates to request by accessing a changelog that identifies updates that server A 304 has made to replica A. The changelog can be at server A 304, at a location shared by server A 304 and server B 306 (e.g., a shared memory, a shared storage), or at server B 306 (e.g., server A 304 can periodically send the changelog to other servers in the distributed file system). At 332, server B 306 updates replica B using the updates received from server A 304 to complete the heal operation. Upon completion of the heal operation, server B 306 can set the out-of-date state of replica B to an up-to-date state. Replica B can now be accessible by client 302 and can be used to repair other replicas within the distributed file system.

Figure 4:
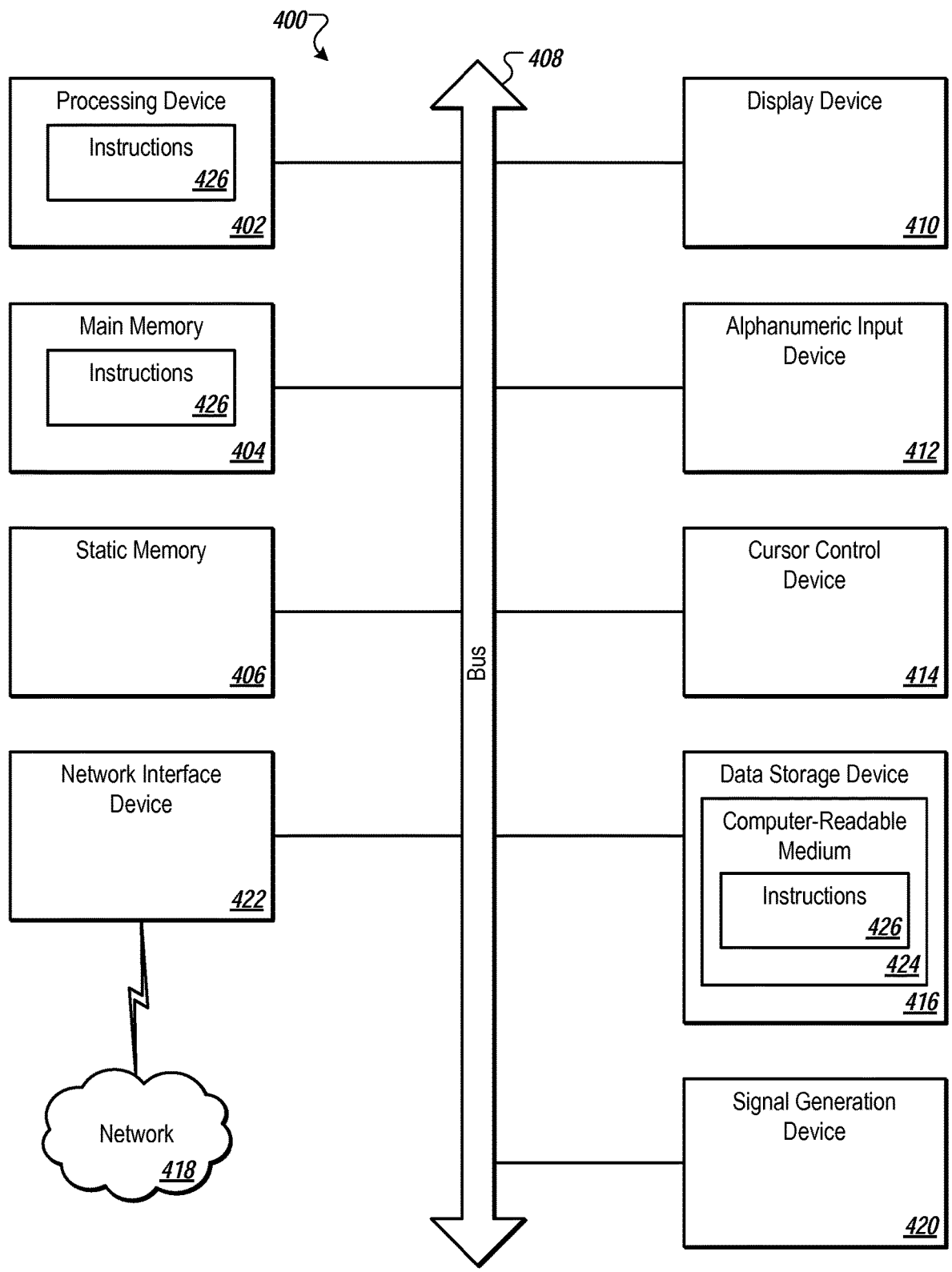
FIG. 4 illustrates an example machine of a computer system within which a set of instructions, for causing the machine to perform any one or more of the methodologies discussed herein, may be executed.

FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computing system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and methods discussed herein.

The computer system 400 may further include a network interface device 422 (e.g., network adapter). The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In one implementation, the instructions 426 include instructions for a state manager and a self-healing manager and/or a software library containing methods that call modules in a state manager and a self-healing manager. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "locating" or "determining" or "self-healing" or "examining" or "comparing" or "acquiring" or "providing" or "receiving" or "updating" or "setting" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:

receiving, by a processing device of a first server of a distributed storage system, a first request to perform a first update to a first replica of a file stored on the first server;

generating an instruction to set a second replica of the file stored on a second server in the distributed storage system to an out-of-date state;

in response to receiving the first request to perform the first update to the first replica, sending, by the processing device prior to performing the first update to the first replica, to the second server in the distributed storage system, the instruction to set the second replica of the file stored on the second server to the out-of-date state, the out-of-date state to prevent client devices from using the second replica of the file until the second replica of the file is updated to match the first replica, the instruction comprising an indication that the first server is performing the first update and information on how to identify and retrieve updates from the first server;

receiving, from the second server over a functioning network connection between the first server and the second server, a confirmation that the second server has set the second replica to the out-of-date state responsive to the instruction received from the first server, wherein to indicate the out-of-date state, the second server to modify a bitmap corresponding to the second replica of the file to a unique combination of bits associated with the out-of-date state;

performing, by the first server, the first update to the first replica without sending the first update to the second server and updating a log to reflect the first update performed to the first replica;

receiving, by the first server, a second request to perform a second update to the first replica of the file;

performing, by the first server, the second update to the first replica without sending the second update to the second server and updating the log to reflect the second update performed to the second replica;

receiving, from the second server, a request for updates to the second replica, wherein the request for updates is received after the second server initiates a heal operation automatically in response to coming back from a powered down state, and wherein the second server determines, during the heal operation, that the first server has updates pertaining to the second replica; and transmitting the first update and the second update to the second server, wherein the second server is to perform the heal operation and update the bitmap corresponding to the second replica of the file to match a combination of bits present in a bitmap corresponding to the first replica of the file.

2. The method of claim 1, wherein transmitting the first update and the second update to the second server comprises transmitting the log to the second server.

3. The method of claim 1, wherein the log comprises a bitmap corresponding to the first replica including a plurality of bits, wherein each bit in the plurality of bits corresponds to a count of updates performed on the first replica.

4. The method of claim 1, wherein the first replica comprises a plurality of data blocks, wherein performing the first update to the first replica comprises writing to one or more of the plurality of data blocks, wherein transmitting the first update and the second update to the second server comprises transmitting data that is larger in size than any data block of the plurality of data blocks.

5. The method of claim 1, wherein the request for updates from the second server is associated with a heal operation at the second server.

6. The method of claim 1, wherein the first request is originated by a first client device and the second request is originated by a second client device.

7. A system, comprising:

a memory;

a processing device operatively coupled to the memory, the processing device to:

receive a first request to perform a first update to a first replica of a file stored on a first server;

generate an instruction to set a second replica of the file stored on a second server to an out-of-date state;

in response to receiving the first request to perform the first update to the first replica, send, to a second server prior to performing the first update to the first replica, the instruction to set the second replica of the file stored on the second server to the out-of-date state, the out-of-date state to prevent client devices from using the second replica of the file until the second replica of the file is updated to match the first replica, the instruction comprising an indication that the first server is performing the first update and information on how to identify and retrieve updates from the first server;

receive, from the second server over a functioning network connection between the first server and the second server, a confirmation that the second server has set the second replica to the out-of-date state responsive to the instruction received from the first server, wherein to indicate the out-of-date state, the second server to modify a bitmap corresponding to the second replica of the file to a unique combination of bits associated with the out-of-date state;

perform the first update to the first replica without sending the first update to the second server and update a log to reflect the first update performed to the first replica;

receive a second request to perform a second update to the first replica of the file;

perform the second update to the first replica without sending the second update to the second server and update the log to reflect the second update performed to the first replica;

receive, from the second server, a request for updates to the second replica, wherein the request for updates is received after the second server initiates a heal operation automatically in response to coming back from a powered down state, and wherein the second server determines, during the heal operation, that the first server has updates pertaining to the second replica; and transmit the first update and the second update to the second server, wherein the second server is to perform the heal operation and update the bitmap corresponding to the second replica of the file to match a combination of bits present in a bitmap corresponding to the first replica of the file.

8. The system of claim 7, wherein the log comprises a bitmap corresponding to the first replica including a plurality of bits, wherein each bit in the plurality of bits corresponds to a count of updates performed on the first replica.

9. The system of claim 7, wherein the first replica comprises a plurality of data blocks, wherein to perform the first update to the first replica, the processing device is to write to one or more of the plurality of data blocks, wherein to transmit the first update and the second update to the second server, the processing device is to transmit data that is larger in size than any one data block in the plurality of data blocks.

10. The system of claim 7, wherein the first request is originated by a first client device and the second request is originated by a second client device.

11. A non-transitory computer readable storage medium including instructions that, when executed by a processing device of a first server of a distributed storage system, cause the processing device to:
receive, by the processing device, a first request to perform a first update to a first replica of a file stored on the first server;
generate an instruction to set a second replica of the file stored on a second server in the distributed storage system to an out-of-date state;
in response to receiving the first request to perform the first update to the first replica, send, by the processing device prior to performing the first update to the first replica, to the second server in the distributed storage system, the instruction to set the second replica of the file stored on the second server to the out-of-date state, the out-of-date state to prevent client devices from using the second replica of the file until the second replica of the file is updated to match the first replica, the instruction comprising an indication that the first server is performing the first update and information on how to identify and retrieve updates from the first server;
receive, from the second server over a functioning network connection between the first server and the second server, a confirmation that the second server has set the second replica to the out-of-date state responsive to the instruction received from the first server, wherein to indicate the out-of-date state, the second server to modify a bitmap corresponding to the second replica of the file to a unique combination of bits associated with the out-of-date state;
perform, by the first server, the first update to the first replica without sending the first update to the second server and update a log to reflect the first update performed to the first replica;
receive, by the first server, a second request to perform a second update to the first replica of the file;
perform, by the first server, the second update to the first replica without sending the second update to the second server and update the log to reflect the second update performed to the first replica;
receive, from the second server, a request for updates to the second replica, wherein the request for updates is received after the second server initiates a heal operation automatically in response to coming back from a powered down state, and wherein the second server determines, during the heal operation, that the first server has updates pertaining to the second replica; and
transmit the first update and the second update to the second server, wherein the second server is to perform the heal operation and update the bitmap corresponding to the second replica of the file to match a combination of bits present in a bitmap corresponding to the first replica of the file.

12. The non-transitory computer readable storage medium of claim 11, further comprising executable instructions to cause the processing device to transmit the log to the second server.

13. The non-transitory computer readable storage medium of claim 11, wherein the log comprises a bitmap corresponding to the first replica including a plurality of bits, wherein each bit in the plurality of bits corresponds to a count of updates performed on the first replica.

14. The non-transitory computer readable storage medium of claim 11, further comprising executable instructions to cause the processing device to transmit data that is larger in size than any data block of a plurality of data blocks comprised by the first replica.

15. The non-transitory computer readable storage medium of claim 11, wherein the request for updates from the second server is associated with a heal operation at the second server.

16. The non-transitory computer readable storage medium of claim 11, wherein the first request is originated by a first client device and the second request is originated by a second client device.

* * * * *